United States Patent [19]
Laurens

[11] 3,895,776
[45] July 22, 1975

[54] VALVE WITH A SPHERICAL CLOSURE-MEMBER

[75] Inventor: Roger Laurens, Ensues-La-Redonne, France

[73] Assignee: Pipeline Equipment Company E.P.C.O., Marseille, France

[22] Filed: Mar. 26, 1974

[21] Appl. No.: 454,934

[52] U.S. Cl. ............... 251/148; 251/152; 251/174; 251/181; 251/315
[51] Int. Cl. .............................................. F16k 5/06
[58] Field of Search .......... 251/148, 150, 151, 152, 251/174, 180, 181, 182, 315

[56] References Cited
UNITED STATES PATENTS
| | | | |
|---|---|---|---|
| 3,542,334 | 11/1970 | Scaramucci | 251/152 |
| 3,647,178 | 3/1972 | Adams | 251/148 |
| 3,656,711 | 4/1972 | Toelke | 251/151 |
| 3,705,707 | 12/1972 | Scaramucci | 251/152 |

*Primary Examiner*—William R. Cline
*Attorney, Agent, or Firm*—Karl W. Flocks

[57] ABSTRACT

A ball valve with a spherical valve member interposed between two tubular elements contained in a cylindrical valve body, comprising an operating shaft of said spherical valve member, two spacing flanges set on each side of said valve body joining it to said tubular elements between which the ball valve is placed. a joint-carrier fluid tight seating being interposed between the spherical valve member and each of the spacing flanges, each of said seating being apt to move within certain limits on each side of an average position around a toric, elastic joint interposed between each of the spacing flanges and the corresponding joint-carrier fluid tight seating, said toric joint being itself movable in its housing placed in the corresponding spacing flange.

6 Claims, 11 Drawing Figures

VALVE WITH A SPHERICAL CLOSURE-MEMBER

The present invention relates to improvements in cocks or valves with a spherical closure member and a round orifice, and having the effect of improving their fluid-tightness, the invention being especially applicable to cocks or valves for piping systems conveying fluids containing solid particles in suspension.

As is well known, cocks or valves with spherical closure members generally comprise a body or casing of cylindrical or substantially cylindrical form having a bottom opposite which is arranged an opening through which passes the actuating rod provided with an operating lever or hand-wheel, this rod being fixed to the closure member by any appropriate means and making it possible to obtain rotation of this latter about the longitudinal axis of the cylindrical casing.

On each side of this axis, the casing is provided laterally with means intended to fix it in a fluid-tight manner to the two piping elements adjacent to the valve, such as for example flanges or distance pieces. Inside the body there are arranged coaxially with the common axis of the two piping elements adjacent to it, that is to say to the axis of flow of the fluid, two seatings located on each side of the longitudinal axis of the said body, these seatings being constituted by identical annular rings, most frequently of metal and of various shapes, provided with an annular joint or lining made of a flexible material with a low coefficient of friction, such as for example "Teflon" or "Nylon" (Registered Trade-Marks) or similar materials.

These seatings are each arranged in a housing provided for that purpose, either in the body of the valve or in the corresponding coupling flange or distance-piece, each of these housings being machined, and such that the corresponding seating may move axially, within certain limits at least, under the effect of axial thrust due either to the pressure of the fluid conveyed or to an elastic mechanical regulating device, or again to the action of these two causes combined, and in such manner that the flexible linings associated with the seatings are applied against the spherical surface of the closure member and ensure fluid-tightness of the valve proper.

Rotation of the spherical closure member about the axis of the valve body is generally obtained by means of pivot pins, the axes of which coincide with the longitudinal axis of said body, and which are fixed to the closure member by any appropriate means which are diametrically opposite. One of these pivot pins rotates in a suitable bearing formed in the bottom of the valve body, while the opposite pivot, constituted partly by the rod of the operating lever, rotates in an appropriate fluid-tight bearing arranged in the portion of the body opposite to the bottom and traversed by the said rod.

Under these conditions, fluid-tightness of the valve remains secure in principle. In fact however, in known valves of this type, there is observed during utilization the appearance of fluid-tightness defects having various origins.

In the first place, due to the fact of their strict adjustment in the housing provided for that purpose, the annular seatings can only move in the axial direction either by the effect of a thrust due to an elastic mechanical device, under the effect of the pressure of the conveyed fluid, or under the effect of these two causes combined. In order that the fluid-tightness may then be obtained, the seatings must be applied against the spherical surface of the closure member in such manner as to be in contact with it along a perfect circle, which makes it necessary that this accurate adjustment must effectively be carried out.

Known machining techniques actually make it possible to attain the desired precision, but due to their high cost, these are not always put into strict use, and as shown by experience, it is not rare to encounter various defects during end of manufacture tests.

Frequently in fact, the closure member becomes displaced with respect to its axis of rotation by one of the bearings, or alternatively the seatings are not exactly coaxial; in one case as in the other, one or both the seatings are not supported on the spherical closure member over a perfect circle, so that an interstice exists between the fluid-tight joint carried by the seating and the spherical surface of the said closure member, which gives rise between the upstream seating and the valve body to a passage of fluid and a passage of this fluid between the body and the downstream seating arranged opposite that preceding.

It is also often found that the bearings of the closure member are perfectly aligned but that its centre is slightly displaced with respect to the common axis of the seatings. In this case, the seatings, guided axially in their respective housings but having no transverse mobility are not supported on the closure member by complete circles of its spherical surface, which from the fluid-tightness point of view involves the same consequences as previously, that is to say leakages of fluid through the valve body. The same thing applies when the surface of the closure member, which necessitates high machining precision, has defects of sphericity.

In the second place, it is often found that when the fluids conveyed in the piping system and through the valve contain particles of dust, hard metal bodies, abrasive products and the like in suspension, these become deposited on the upstream wall of the closure member when the latter is closed. During the opening of the valve, some of these solids adhere to the spherical surface of the closure member and either become encrusted in the fluid-tightness lining of the annular seating or collect there and thus form a thick deposit or cause prematurely wear of the said lining.

In the first case, during the subsequent operations, these hard encrusted particles scratch the smooth fluid-tightness zone of the spherical surface and result, at the end of a more or less long period, in more or less considerable leakages. In the second case, the deposits of particles result in over-thicknesses or in unequal and premature wear of the lining, which also results in an inefficient fluid-tight bearing surface.

In the third place, it is often found during use that the annular seatings of such valves, held with a constant pressure against the spherical surface of the closure member or by an elastic mechanical device, or by the pressure of the fluid conveyed, or again by the conjoint effect of both these conditions, have a tendency when a rapid fall in pressure occurs, and especially after one or two opening and closure operations, not to be adequately applied against the spherical surface of the closure member, which adversely affects the fluid-tightness of the valve.

Finally the operating lever of the closure member is either fitted in the form of a key or tenon on the corresponding top of the spherical surface, or alternatively it is fitted into the said closure member and is then welded on this latter. In the first case, it is found that after a certain number of operations of the valve and especially when the value of the operating torque is high, there occurs a cold-rolling or slight creep of the metal in the zones in contact, causing the formation of a certain play. This play has the effect, during subsequent operations of the valve, of modifying the alignment of its constituent parts and for this reason and for the reasons mentioned above, of producing little by little a lack of fluid-tightness when the closure member is closed.

In the second case, the weld carried out through the interior of the bore receiving the operating lever arranged in the closure member and the letting-down and annealing operation which are associated with it present difficulties and are liable to cause deformation of the spherical surface of the said closure member, with its resulting consequences in respect to fluid-tightness. In addition, due to the geometrical position of the weld, it is difficult to carry out any satisfactory control, and it is possible that it may be defective and that in service an ejection of the rod may take place towards the exterior under the effect of pressure of the conveyed fluid in the event of rupture of the welding metal.

The present invention obviates these defects and disadvantages by providing a valve or a cock with a completely removable spherical closure member, the fluid-tightness of which is ensured even if the said closure member has slight constructional defects and is maintained for a long time in spite of the wear of some of its parts caused by repeated operations, and in which the operating shaft of the closure member preserves its fluid-tightness and even increases this under the effect of the pressure of the conveyed fluid.

The valve or cock with a spherical closure member according to the invention, intended to be interposed between two parts of the same conduit system, is essentially characterized by the fact that it comprises, in combination:

A valve body of substantially cylindrical shape constituting the support of a spherical closure member with a cylindrical orifice, movable in rotation about the longitudinal axis of the said body and with respect to this latter, and provided for that purpose with a pivot-pin and an operating shaft both coaxial with the said longitudinal axis, the said body having a plane of symmetry passing through its longitudinal axis and having a transverse cylindrical orifice with a longitudinal axis perpendicular to its plane of symmetry and which intersects it at the centre of the spherical closure member, the said transverse orifice being limited on each side of the plane of symmetry of the body by two flat annular faces parallel to the said plane of symmetry.

Two identical spacing flanges coaxial with the longitudinal axis of the transverse orifice formed in the valve body, the common axis coinciding with that of the conduit containing the valve, the two said spacing flanges being symmetrical with each other with respect to the plane of symmetry of the valve body, each of them being fixed on the said valve body, on the one hand by engagement of one of its transverse end faces in the corresponding inlet of the transverse cylindrical orifice of the valve body, the transverse faces in contact having shapes complementary to each other, a fluid-tight joint being interposed between two of the faces in contact, and on the other hand by removable means for fixing together the parts in contact, the said facing flanges being provided on their transverse faces opposite to those by which they are fixed to the valve body, with means for coupling each of them to one of the conduit parts between which the valve is interposed.

Two identical fluid-tight joint-carrying seatings, each constituted by a body of revolution arranged in the normal position on the one hand coaxially with each other, their axes of revolution coinciding with the longitudinal axis of the conduit system, and on the other hand, symmetrically to each other with respect to the plane of symmetry of the valve body, each of the said seatings having a cylindrical orifice the axis of which coincides with its axis of revolution and the internal diameter of which is equal at the same time to the internal diameter of the cylindrical orifice of the closure member and to the internal diameter of the conduit system; having a substantially frusto-conical surface on one face, the axis of revolution of which is that of the said seating and which is arranged facing the spherical surface of the closure member and in the immediate vicinity of this latter, and provided with an annular groove for receiving a toric fluid-tight joint having the axis of revolution as its longitudinal axis, the said toric joint being supported on the spherical surface of the closure member along a circle of the said spherical surface; each said seating having a substantially cylindrical external lateral surface arranged facing the internal lateral face of a substantially cylindrical housing formed in the corresponding spacing flange, the said internal face being coaxial with the axis of the conduit system and being provided with an annular groove for receiving a fluid-tight toric joint, which annular groove has as its transverse section a rectangle the width of which has a value greater and the depth a value less than that of the diameter of a circular central section of the toric joint, which toric joint is supported by its outer equatorial circle on the bottom of the rectangular groove along which it is able to move, and is supported by its internal equatorial circle on the lateral face of the said seating with which it cooperates, the respective forms of the internal lateral face of the housing of the seating and of external lateral face of the said seating being such that the distance which separates them is a minimum at the level of the said fluid-tight toric joint; being provided with a transverse face opposite to the frusto-conical face placed opposite the spherical surface of the closure member, and which cooperates with a compressible elastic member supported directly or through the intermediary of a rigid part on a shoulder formed on the lateral internal face of the said seating.

According to other advantageous characteristics:

Each of the seatings is provided on its fluid-tight joint-carring frusto-conical face with an annular housing in which is embedded an annular scraper segment supported on the spherical surface of the closure member along a circle of this latter, the diameter of which is slightly greater than that of the cylindrical orifice of the said closure member, the said scraper segment co-operating with this same closure member.

The operating rod for rotating the closure member about the longitudinal axis of the valve body comprises a male extremity of frusto-conical shape coaxial with the said rod flared towards the centre of the closure member, embedded in a housing of complementary frusto-conical form arranged in the corresponding closure member and fixed thereto by means of a fixing member.

According to a first form of construction, the external lateral faces of the fluid-tight joint-carrying seatings are provided in their central section with a convex portion turned towards the exterior, while the internal lateral faces of the seat housing of the corresponding facing flanges located facing those preceding, have a convex portion at their central section turned towards the interior.

According to a second form of construction, the external lateral faces of the fluid-tight joint-carrier seatings have their central section turned towards the exterior, while the interior lateral faces of the housing of the seating of the corresponding spacing flanges are cylindrical.

According to a third form of construction, the external lateral faces of the fluid-tight joint-carrier seatings are provided in their central section with a convex portion turned towards the exterior, while the internal lateral faces of the seating housing of the corresponding spacing flanges have at their central section a concave portion turned towards the interior, such that its radius of curvature is greater than that of the central section of the seating.

In accordance with a fourth form of embodiment, the external lateral faces of the fluid-joint carrier seatings are cylindrical, while the internal lateral faces of the seating housing of the corresponding spacing washers are provided in their central section with a convex portion turned towards the interior.

In an advantageous manner, the position of the compressible elastic member on which is supported the transverse face of the seating, opposite to the frusto-conical face placed facing the spherical face of the closure member, is adjustable axially, the said compressible elastic member being constituted for that purpose by an elastic washer supported on an annular ring, the internal diameter of which is equal to the internal diameter of the corresponding spacing washer and the external diameter is slightly greater than that of the elastic washer, the said annular ring being arranged in a cylindrical housing extending the housing of the external lateral face of the corresponding seating and having a frusto-conical external lateral face open towards the said seating and forming an inclined ramp co-operating with the frusto-conical extremity having an apex angle complementary to the apex angle of the frusto-conical face of the said annular ring of at least one screw, the longitudinal axis of which is arranged radially, intersecting the longitudinal axis of the corresponding spacing flange and with a threaded portion formed in the said spacing flange, the said screw being provided with fluid-tight sealing means and means for driving it in rotation about its axis.

Other characteristic features and advantages of the invention will be more clearly brought out in the description given below by way of example and without limitation, of a valve according to the said invention, reference being made to the accompanying drawings, in which.

Figure 8:
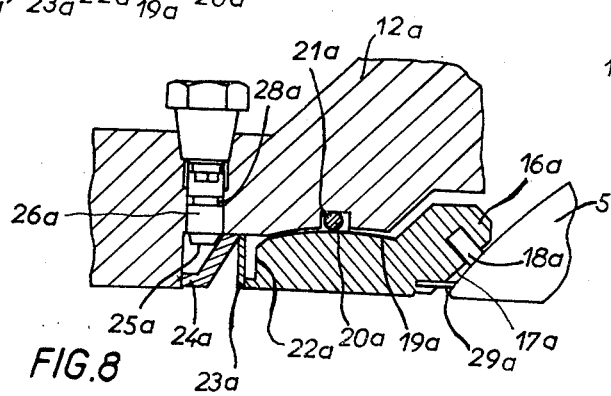
Figure 7:
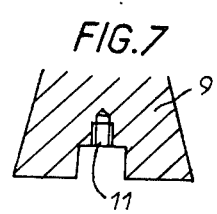
FIG. 7 represents a view taken along the axis B—B of FIG. 5.

and FIG. 8 shows a view in transverse section of a valve seating according to the invention, provided with a regulating device.

In these drawings, the same parts are represented by the same reference numbers.

Figure 1:
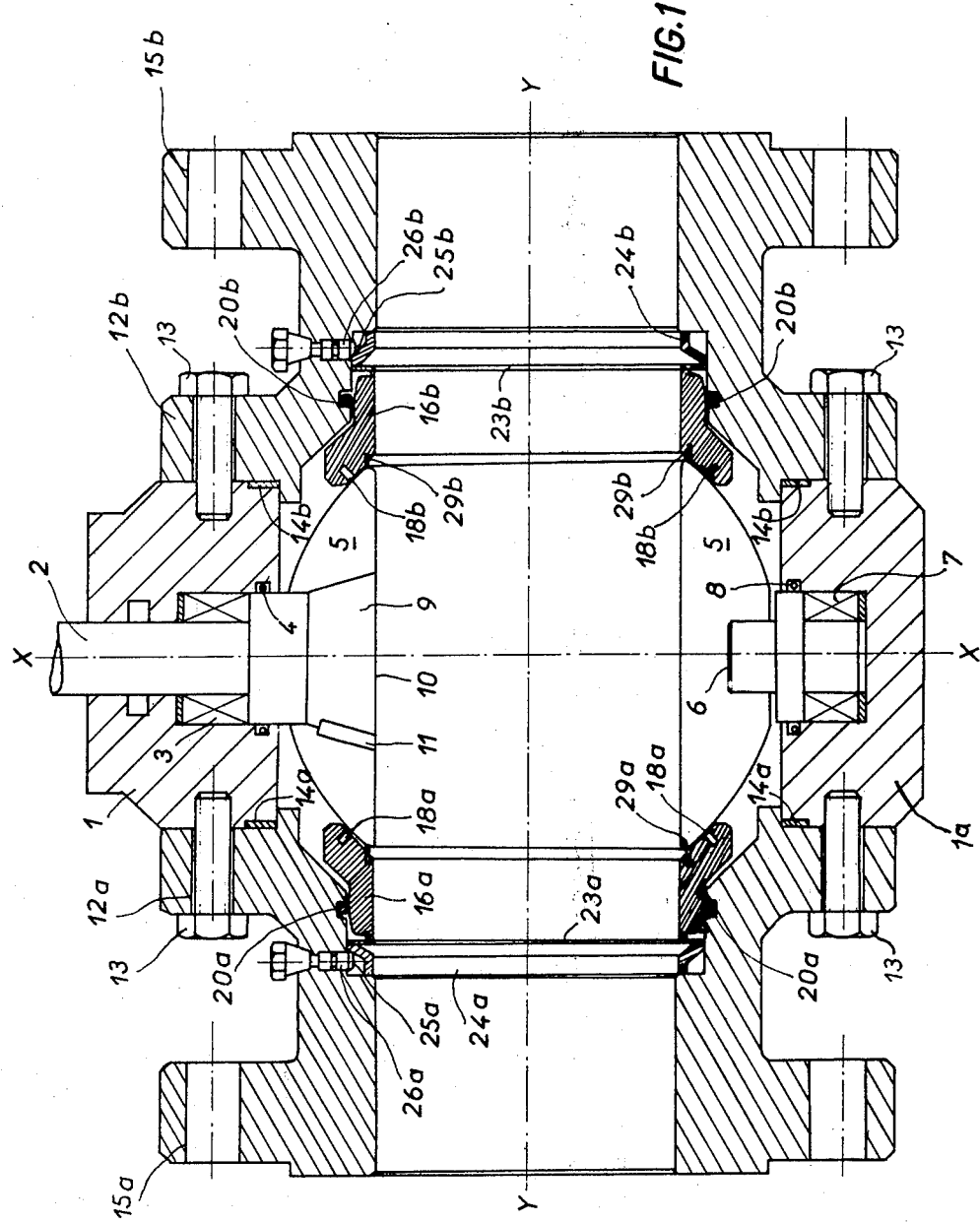
FIG. 1 shows a view in axial section of a valve with a spherical closure member according to the invention.

Referring first of all to FIG. 1, the valve with a spherical closure member according to the invention is constituted by a cylindrical or substantially cylindrical one-piece casing or body 1 closed transversely on one side by a bottom 1a, the portion opposite to this bottom comprising an axial opening traversed longitudinally by the shaft 2 of the operating lever of the said valve, movable in rotation about its longitudinal axis X—X and co-operating with one or more bearings 3 of any appropriate known type, preferably of the self-lubricating type previously mounted on the body 1, the fluid-tightness between the said shaft 2 and the valve body 1 being ensured by known means such as, for example, fluid-tight joints 4.

On the side of the spherical closure member 5, diametrically-opposite to the shaft 2, a pivot 6 is mounted coaxial with the shaft 2 by any appropriate known means, the pivot co-operating with one or a number of bearings 7 of any suitable known type, preferably self-lubricating and previously mounted or directly machined from the solid of the bottom 1a of the valve body 1, the fluid-tightness between the said bearings and the pivot 6 being ensured by means of suitable joints 8.

By this means, the spherical closure member 5 is rendered movable for rotation about the longitudinal axis X—X of the body 1, this axis passing through the centre of the spherical surface.

Figure 4:
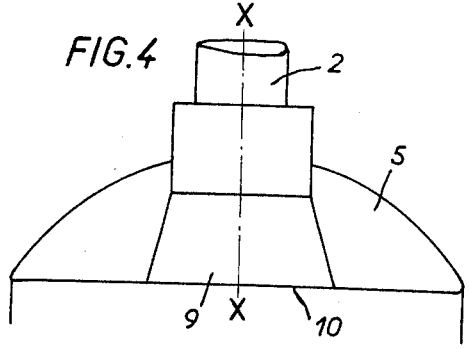
FIGS. 4 and 5 represent views in axial section of two forms of construction of the fixing device according to the invention of the operating lever for the spherical closure member on this latter.

As shown in FIG. 4, and in accordance with the invention, the fixing of the shaft 2 on the closure member 5 is effected in the following manner: the extremity 9 of the shaft 2 has a frusto-conical shape produced by machining, the transverse end face of the said shaft constituting the large base 10 of the truncated cone, this base being formed by a part of the cylindrical surface of the orifice of the closure member.

The corresponding portion of the closure member 5 on which the shaft 2 is fixed comprises a frusto-conical bore, the form of which is also frusto-conical and complementary with that of the male frusto-conical extremity of the rod 2, the female frusto-conical bore of the closure member being extended by a cylindrical bore of the same diameter as that of the shaft 2 or as that of the portion of this latter which precedes its frusto-conical end-portion.

Figure 5:
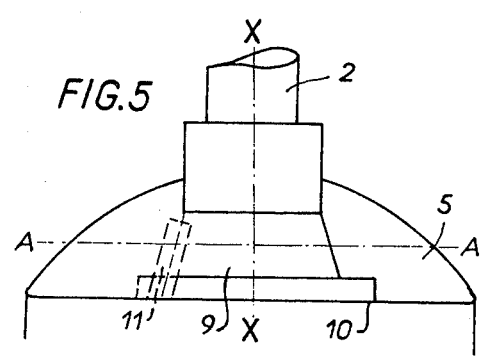
Figure 3D:
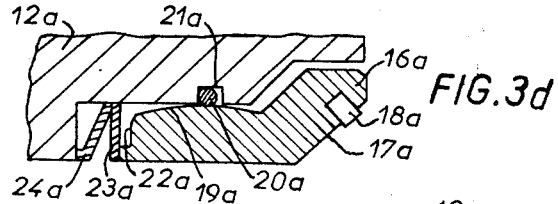

The shaft 2 may thus be mounted by fitting into the closure member, the fitting being effected through the interior of the cylindrical orifice formed in the closure member for the passage of fluid through the valve, so that the complementary parts of the shaft and the closure member come together in correct adjustment. Advantageously, the fixing of the two parts is completed, as shown in FIG. 5, by means of a key 11 forcibly driven into an opening constituted by an assembly of two grooves arranged facing each other, one in the male frusto-conical end portion of the shaft 2, the other in the bored conical portion of the spherical closure member, or by any other equivalent means.

In this way, when the valve is in service, the pressure of the fluid applies against the end face of the shaft 2 a force which tends to push the shaft into its housing and prevents the ejection of this latter from the closure member as a result of the wedge effect produced.

The valve body described above is provided laterally with two circular orifices, coaxial with the axis of the cylindrical orifice of the closure member when this latter is in the open position, each limited by an annular ring on the flat transverse outer wall of which is fitted a spacing flange 12a and 12b, fixed to the valve body for example by means of bolts or studs 13 angularly distributed in a uniform manner or round the corresponding annular ring of the body 1, while being deeply in the body, annular joints 14a and 14b for fluid-tightness and preventing fire being disposed between the flanges and the valve body.

With each of the spacing flanges 12a or 12b is associated an annular seating 16a or 16b made of any suitable metallic material and fitted into a housing formed for that purpose in the corresponding spacing flange, the internal diameter of the said seating being equal to the internal diameter of the cylindrical orifice of the closure member. Each of the said seatings (see especially FIGS. 2, 3a, 3b and 4c) has a body or revolution about the axis of flow Y—Y of the fluid in the conduit system, such that on the one hand it has a frusto-conical face 17a or 17b opposite the spherical surface of the closure member and arranged in the immediate vicinity of the said spherical surface, the said fursto-conical face being provided with an annular slot in which is embedded an elastic joint or lining 18a or 18b, fluid-tight and made from any appropriate material such as "Teflon" (Registered Trade-Mark) "Nylon" (Registered Trade-Mark) or any other similar material, the said fluid-tight joint being in contact with the spherical surface of the closure member and being held against it as indicated later, while on the other hand its outer face 19a or 19b by which it is engaged inside the corresponding sleeve flange, and in which an annular housing is formed for that purpose, has a shape slightly different from that of the lateral face of this housing, and such that their surfaces, while remaining very close to each other, are separated by a very small space, the dimension of which is a minimum in an annular zone in which is arranged an elastic and fluid-tight toric joint 20a or 20b, coaxial with the corresponding seating, made from any appropriate material similar to that from which the fluid-tight joint 18a or 18b is made.

Figure 2:
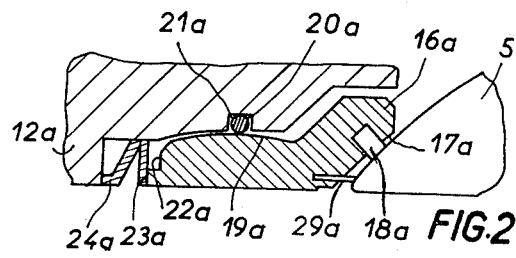
FIG. 2 shows a partial view in axial section of one of the seatings of the valve shown in FIG. 1.
Figure 3A:
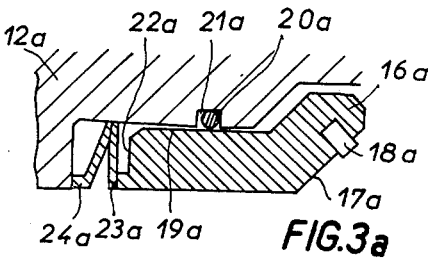
FIGS. 3a, 3b, 3c and 3d represent partial views in axial section similar to that of FIG. 2, of valve seatings according to the invention having different central sections, the closure member not being shown.
Figure 3B:
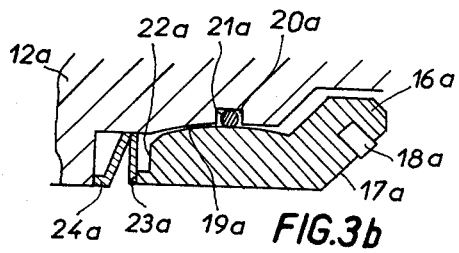
Figure 3C:
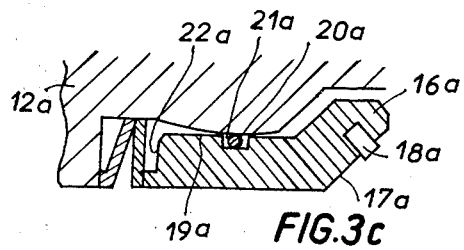

A housing constituted by a groove 21a or 21b of rectangular section is provided for the joint 20a and 20b either in the flange-sleeve 12a or 12b as shown in FIGS. 2, 3a, 3b and 8, or in the seating 16a or 16b itself, as shown in FIG. 3c. The diameter of the toric joint 20a or 20b is such that it is at the same time less than the width of the rectangular groove 21a or 21b and greater than the depth of this latter.

In this way, the seatings 16a and 16b are not normally in contact with the corresponding internal lateral faces of their respective housings, such an arrangement then permitting slight transverse displacements of the said seatings, that is to say perpendicular to their common axes of revolution Y—Y, due to the elasticity of the toric joints 20a or 20b.

In addition, the fact that the diameter of the transverse sections of these joints is less than the width of the groove of rectangular section in which they are mounted, gives them a certain mobility parallel to the axis Y—Y of the spacing flanges 12a and 12b, so that the said seatings have a certain mobility with respect to their axis of revolution which gives this latter the possibility of moving, within certain limits, around the common axis Y—Y of the spacing flanges 12a and 12b.

In order that this mobility may effectively be made possible, it is necessary that a certain space should separate the lateral surfaces 19a and 19b of the seatings of the corresponding surfaces facing these latter in their respective housings. To this end, various forms of construction may be provided for these surfaces, and these are shown by way of example in FIGS. 2, 3a, 3b, 3c, 3d and 6.

As shown in FIGS. 2 and 3b, the lateral surface 19a or 19b of the seating may be convex, while the lateral surface of its oppositely facing housing is concave, the radius of curvature of this latter being then greater than that of the surface 19a or 19b. As shown in FIGS. 3a and 3c, the lateral surface 19a or 19b of the seating is cylindrical, the axis of the corresponding cylinder being the axis of revolution of the seating, while the lateral surface of its oppositely facing housing is convex.

As shown in FIG. 3b, the lateral surface 19a or 19b of the seating is convex while the lateral surface of its housing is a surface of revolution. In all these forms of construction, the position of the fluid-tight joint 19a or 19b is chosen in such a manner that the pressure applied by the conveyed fluid on the portion of the frusto-conical face 17a or 17b of the seating, comprised between the said joint and the edge of its internal cylindrical piping system, is less than the pressure applied by the said fluid on the face 22a or 22b opposite to that preceding, the resultant of the forces of opposite directions applied on the opposite faces of the same seating forcing this latter, and in consequence the corresponding fluid-tight joints, against the spherical closure member.

In addition, the face 22a or 22b of the seating opposite to that which is arranged facing the closure member and which carries the joint 18a or 18b is supported against a spring washer 23a or 23b of any suitable type interposed between the said joint and either a shoulder (not shown) formed for that purpose in the corresponding spacing flange, or on a spacing member 24a or 24b supported on the end shoulder of the housing of the seating.

The spring washer 23a or 23b is put under tension during the assembly and applies against the seating a continuous force of pre-determined value which forces it against the closure member, the contact between this latter and the seating being effected by means of the fluid-tight joint 18a or 18b.

The device described above for maintaining the seating applied against the closure member is generally speaking sufficient to obtain fluid-tightness under the conditions of use for which the valve is provided. However, it may be an advantage in certain cases to be able to regulate the application force of the seatings on the closure member, for example when the valve is mounted on the conduit system and the latter is required to carry fluids the nature of which may change over a period of time.

Figure 6:
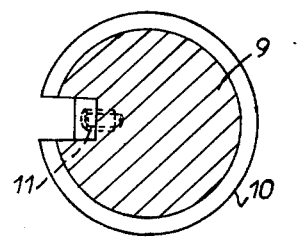
FIG. 6 represents a view taken along the axis A—A of FIG. 5.

The regulating device for the thrust of the seating on the closure member is then constituted according to the invention in the following manner: the spacing device 24a or 24b is constituted as shown in FIGS. 1 and 6 by an annular member of which part of the face opposite to the corresponding spring washer is a frusto-conical surface of revolution about the axis Y—Y of the spacing flange, co-operating with the extremity 25a or 25b also frusto-conical shape, of screws 26a or 26b arranged in a uniform manner around the corresponding spacing flange, and the axes of which are perpendicular to the axis Y—Y and intersect this latter at the same point, the apex angles of the frusto-conical extremities 25a or 25b of the said screws being complementary to the apex angle of the frusto-conical surface of the corresponding member 24a or 24b.

The threaded portions of the screws 26a or 26b co-operate with a threaded portion provided for that purpose in the corresponding spacing flanges, so that when the said screws are tightened and in consequence the frusto-conical extremities 25a or 25b of these screws move towards the interior, they cause the movement of the part 24a or 24b towards the centre of the closure member, so that the member applies a thrust on the corresponding spring washer, which has the effect of increasing the clamping force of the seating and in consequence of the corresponding sealing joint on the closure member. The unscrewing of the said screws produces the reverse effect.

The screws 26a or 26b are provided with a head 27a or 27b of any appropriate type which enables it to be handled either manually or by means of a suitable tool and which can be made removable. In addition, fluid-tightness means such as suitable joints of known type 28a or 28b are arranged in the passage bores of the screws between the internal orifices of the said bores and the extremities of the corresponding threaded portions, for the purpose of avoiding any leakage of fluid through these regulating devices.

In accordance with the invention, the seatings 12a and 12b are advantageously provided with scraper rings 29a and 29b embedded in an angular groove having the same axis as the corresponding seating and arranged on the face of the seating located opposite to and in the immediate vicinity of the spherical closure member.

This annular groove is arranged in the corresponding seating as close as possible to the internal lateral face of the said seating, in the alignment of which is placed the cylindrical orifice of the closure member in the position corresponding to the full opening of the valve, so that the scraper ring 29a or 29b is applied against the spherical closure member along a circle the radius of which is slightly greater than that of the hollow cylinder constituting the cylindrical orifice formed in the said closure member. This scraper ring is made from a synthetic material such as "Nylon" (Registered Trade-Mark) or any other similar flexible material.

The valve or cock such as described above makes it possible to obtain perfect fluid-tightness between the two parts of the conduit system arranged on each side of the said valve or the said cock, this fluid-tightness being maintained over a period of time, even after a very long period of service.

In fact, since the joint-carrier seating of the valve have a certain transverse mobility and their axes can move away from the axis of the axis of the spacing flanges which serve as their support, the consequence is that if, as a result of a slight machining defect, the axes of the pivot pins of the closure member are not perfectly in alignment, this latter becomes slightly displaced with respect to the position which it should normally occupy, the force that it applies on the seatings (in two diametrically opposite zones) has the effect of causing a movement of these seatings such that the corresponding joint becomes applied against the spherical surface of the closure member along a circle of this surface along which the said joint is maintained under pressure ensuring fluid-tightness, contrary to what takes place when, as is generally the case, the seatings only have a single degree of freedom, namely that corresponding to axial displacements.

The valve or cock according to the invention thus makes it possible to remedy slight defects of machining which may have taken place during their manufacture and thereby enables less rigorous machining tolerances in manufacture to be accepted.

Similarly, when after a more or less long period of service, the wear of the pivot pins or their bearings involves the existence of axial or transverse play in the movements of rotation of the closure member, the effects of which are similar to those produced by a defect of alignment of the pivot pins, the fluid-tightness defects which could thereby result for the valve are corrected in the same manner as in the case mentioned above, by reason of the mobility of the seatings with three degrees of freedom, this mobility rendering "floating" the joints which they carry.

In addition, the presence on each of the seatings of a scraper ring supported on the spherical surface of the closure member in a zone very close to the lateral wall of the flow conduit (a ring which may be constituted, if so desired, by an additional fluid-tightness joint) prevents the formation of deposits of solid particles liable to be found either accidentally or naturally in the conveyed fluid, and becoming deposited on the surface of the closure member when the valve is closed.

When such deposits do form, and especially when they originate from particles of abrasive products, they give rise during the operation of the closure member to more or less serious damage to the spherical surface and the fluid-tight joints, precisely in the zones of contact between the said joints and the said closure member.

This damage to the contact surfaces generally results in the formation within a more or less short time, of numerous scratches of small dimensions extending on each side of these contact zones and which, when the closure member interrupts the circulation of the fluid, facilitates infiltrations of fluid, on the one hand between the conduit and the interior of the valve body, and on the other hand between this latter and the closed portion of the conduit system, which finally results in a passage of fluid between the portion of the conduit system under pressure and the portion of this latter closed by the valve.

Due to the fact that they prevent the formation of deposits in the zones of contact between the joints and the closure member, and eliminate such deposits when they have a tendency to form, these scraper rings contribute to the maintenance of fluid-tightness of the valve over a long period. In fact, the particles are deposited, in the closure position of the closure member, on the surface of this latter defined by the lower portion of the scraper ring. During the opening of the valve, the closure member rotates about its axis and all the particles accumulated on this surface are scraped by the scraper ring and become collected in the vicinity of this latter. When the valve is fully opened, the particles thus collected are then evacuated by the flow of fluid.

Furthermore, the fact that the spacing flanges are fitted into the valve body and are fixed to it by simple bolts permits them to be dismantled very easily for the purpose of any technical operation which might prove necessary.

Thus for example, in the case where the conduit system is required to convey gaseous oxygen, it is necessary, in order to prevent any fire or explosion of readily oxidizable products such as deposits of grease or oil, to proceed to careful cleaning operations before putting into service.

The dismantling facility offered by the valve described above enable these operations to be carried out easily and rapidly. These dismantling facilities further permit rapid action to be taken in the case where corrosive or active products, such as brine or sulphurized products are to be conveyed through the valve and for that purpose enable the appropriate treatments of these various elements to be carried out rapidly, such as stabilization or annealing treatments of the welds, or lining the internal walls by means of a material which is resistant to the active products conveyed. The said lining may be obtained by any appropriate known method (electrolysis, chemical bath, projection, etc.).

Similarly, these dismantling facilities can make it possible to proceed rapidly to the exchange of parts on the valve made of ordinary alloy by similar parts made of known special alloys which are resistant to the product which it is proposed to convey. It is furthermore clear that the constituent parts of such valves may be made, at the time of manufacture, of any alloys appropriate to the conveyance of corrosive fluids or which comprise internal linings capable of withstanding contact with such fluids.

It will of course be understood that the present invention has only been described and illustrated by way of a preferred example, and that technical equivalents may be made in its constituent elements without thereby departing from the scope of the said invention as defined in the appended claims.

I claim:
1. A valve or cock with a completely dismantlable spherical closure-member interposed between two tubular elements of the same conduit system, comprising: a substantially cylindrical valve body constituting the support of a spherical closure-member with a cylindrical orifice, movable in rotation about the longitudinal axis of the said body and with respect to this latter, and provided for that purpose with a pivot-pin and an operating shaft coaxial with the said longitudinal axis, the said shaft being provided as required with a means for preventing ejection of the said operating shaft by the effect of the pressure of the fluid intended to circulate in the conduit system, the said valve body having a plane of symmetry passing through its longitudinal axis and having a cylindrical transverse orifice with a longitudinal axis perpendicular to its plane of symmetry which coincides with the longitudinal axis of the conduit system and intersects this axis at the centre of the spherical closure member, the said transverse orifice being limited on each side of the plane of symmetry of the valve body by two flat annular faces parallel to the said plane of symmetry; two spacing flanges identical with each other and coaxial with the longitudinal axis of the transverse orifice formed in the valve body, the common axis coinciding with that of the conduit system containing the valve, the two said spacing flanges being symmetrical with each other with respect to the plane of symmetry of the valve body, each of them being fixed on the said valve body, on the one hand by fitting one of its transverse end-faces into the corresponding inlet of the transverse cylindrical orifice of the valve body, the transverse faces in contact being complementary in shape with each other, a fluid-tight joint being interposed between two of the faces in contact, and on the other hand by removable means for fixing together the parts in contact, the said spacing flanges having on their transverse faces opposite to those by which they are fixed on the valve body, means for coupling each of them to one of the conduit elements between which the valve is interposed, the internal portion of each of the said spacing flanges arranged opposite the spherical portion of the closure member comprising a frusto-conical portion coaxial with the longitudinal axis of the valve body, open and placed on the side of the said body, and a portion adjacent to the frusto-conical portion of revolution about the longitudinal axis of the valve body, the surface of which has a pseudo-cylindrical shape adapted to that of the fluid-tight member interposed between the spacing flange and the spherical surface of the closure member and being provided, as may be required, with an annular groove for the reception of a toric fluid-tight joint, which annular goove has for its radial section a rectangle, the width of which has a value greater than and a depth less than that of the diameter of the circular central section of the toric joint, which toric joint is supported by its external equatorial circle on the bottom of the said groove along which it can be displaced; and two identical joint-carrier fluid-tight seatings forming the fluid-tight members interposed between the internal face of each of the facing flanges and the spherical surface of the closure member, and each constituted by a body of revolution arranged in the normal position on the one hand coaxially with each other, their axes of revolution then coinciding with the longitudinal axis of the conduit system and on the other hand symmetrically with each other with respect to the plane of symmetry of the valve body, each of the said seatings have a cylindrical orifice the axis of which coincides with its axis of revolution and the internal diameter is equal at the same time to the internal diameter of the cylindrical orifice of the closure member and to the internal diameter of the conduit system; having an internal face of substantially frusto-conical shape, the axis of revolution of which is that of the said seating and which is arranged facing the spherical surface of the closure member and in the immediate vicinity of this latter, provided with an annular groove for the reception of a toric fluid-tight joint having the axis of revolution of the seating as its longitudinal axis, which toric joint is supported on the spherical surface of the closure member along a circle of the said spherical surface, and provided as may be required, with an annular housing coaxial with the axis of revolution of the seating in which is embedded an annular scraper segment supported on the spherical surface of the closure member along a circle of this latter the diameter of which is slightly greater than that of the cylindrical orifice of the said closure member, the said scraper segment co-operating with the said closure member; having an external lateral face substantially of revolution about its longitudinal axis arranged opposite the corresponding internal face of the corresponding spacing flange and comprising a conical portion arranged opposite the conical portion of the said internal face, and a pseudo-cylindrical portion arranged opposite the pseudo-cylindrical portion of the said internal face having the shape adapted to this latter, the said pseudo-cylindrical external face being provided as may be required with an annular groove for reception of the toric fluid-tight joint, the external equatorial circle of which is in contact with the internal lateral pseudo-cylindrical face of the spacing flange and the internal equatorial circle is in contact with the external lateral pseudo-cylindrical surface of the corresponding joint-carrier seating, which annular groove has for its radial section a rectangle the width of which has a value greater than and the depth has a value lower than that of the diameter of the circular central section of the toric joint, which is supported by its internal equatorial circle on the bottom of the said groove, the respective shapes of the lateral internal pseudo-cylindrical face of the housing of the joint-carrier seating in the spacing flange and of the external lateral pseudo-cylindrical face of the said seating being such that the distance separating them is a minimum at the level of the said fluid-tight toric joint; being provided with a transverse face opposite to the frusto-conical face placed facing the spherical face of the closure member and which co-operates with a compressible elastic member supported directly or through the intermediary of a rigid member on a shoulder formed on the internal lateral surface of the spacing flange, the position of the said compressible member on which is supported the transverse face of the seating opposite to its frusto-conical face placed facing the spherical face of the closure member being capable of being axially regulated as may be required, the said compressible elastic member being constituted for that purpose by an elastic washer supported on an annular ring, the external diameter of which is equal to the internal diameter of the corresponding spacing flange and the external diameter is slightly greater than that of the elastic washer, the said annular ring being arranged in a cylindrical housing extending the housing of the external frusto-conical lateral face open towards the said seating and constituting an inclined ramp co-operating wth the frusto-conical extremity having an apex angle complementary to the apex angle of the frusto-conical face of the said annular ring of at least one screw the longitudinal axis of which is arranged radially, intersects the longitudinal axis of the corresponding spacing flange and co-operates with a threaded portion formed in the said coupling flange, and said screw being provided with fluid-tight closure means and means for driving in rotation about its axis.

2. A valve or cock with a spherical closure member in accordance with claim 1, in which the means for preventing ejection of the operating shaft controlling the rotation of the closure member about the longitudinal axis of the valve body is constituted by an end portion of the said shaft arranged on the side of the closure member of male frusto-conical shape flared towards the centre of the closure member, embedded in a housing of complementary female frusto-conical shape formed in the corresponding portion of the closure member and fixed to this portion by means of a fixing member.

3. A valve or cock with a spherical closure member in accordance with claim 1, in which the external lateral faces of the fluid-tight joint-carrier seatings are cylindrical, while the internal lateral faces of the seating housing of the corresponding spacing flanges located facing those preceding have a convex portion turned towards its longitudinal axis and comprise the toric rectangular joint-carrier groove, the internal equatorial circle of the toric joint being supported joint-carrier seating along the circle of this latter which is nearest to the internal lateral face opposite the spacing flange.

4. A valve or cock with a spherical closure member in accordance with claim 1, in which the external lateral faces of the joint-carrier seatings are cylindrical, while the internal lateral faces of the seating housing of the corresponding spacing flanges located opposite those preceding have a convex portion turned towards its longitudinal axis, the said joint-carrier seatings each comprising the rectangular toric joint-carrier groove, the said toric joint being supported on the bottom of the said groove by its internal equatorial circle, its external equatorial circle being supported on the internal lateral face of the said corresponding facing flange along the circle of this later which is closest to the external lateral face of the said fluid-tight joint-carrier.

5. A valve or cock with a spherical closure member in accordance with claim 1, in which the external pseudo-cylindrical lateral faces of the fluid-tight joint-carrier seatings have a convex portion turned towards the exterior of their longitudinal axis, while the corresponding internal lateral faces of the seating housing of the spacing flanges have a concave portion turned towards the interior of their longitudinal axis, their curvature being less than that of the concave faces of the joint-carrier located opposite, the said internal lateral faces comprising the toric rectangular joint-carrier groove, the external equatorial circle of this latter being supported on the bottom of the said rectangular groove while its internal equatorial circle is supported on the corresponding external lateral face of the joint-carrier seating along the circle of this latter which is nearest to the external lateral face of the housing of the fluid-tight joint-carrier.

6. A valve or cock with a spherical closure member in accordance with claim 1, in which the pseudo-cylindrical external lateral faces of the joint-carrier fluid-tight seatings have a convex portion turned towards the interior of their longitudinal axis while the internal lateral faces of the seating housings of the spacing flanges are cylindrical and comprise the rectangular toric joint-carrier groove, the external equatorial circle of this latter being supported on the bottom of the said groove while its internal equatorial circle is supported on the external lateral face of the joint-carrier along the circle of this latter which is nearest to the cylindrical lateral face of the housing of the fluid-tight joint-carrier.

* * * * *